US012049334B2

(12) United States Patent
Olsson et al.

(10) Patent No.: US 12,049,334 B2
(45) Date of Patent: Jul. 30, 2024

(54) SYSTEM AND METHOD FOR SHEET COIL PACKAGING

(71) Applicant: Lamiflex Group AB, Nyköping (SE)

(72) Inventors: Kristoffer Olsson, Nyköping (SE); Petter Järte, Bromma (SE); Marcus Forssblad, Stigtomta (SE); Björn Molin, Nyköping (SE)

(73) Assignee: Lamiflex Group AB, Nyköping (SE)

( * ) Notice: Subject to any disclaimer, the term of this patent is extended or adjusted under 35 U.S.C. 154(b) by 0 days.

(21) Appl. No.: 18/096,915

(22) Filed: Jan. 13, 2023

(65) Prior Publication Data

US 2023/0227188 A1 Jul. 20, 2023

(30) Foreign Application Priority Data

Jan. 17, 2022 (SE) .................................. 2250032-6

(51) Int. Cl.
| | |
|---|---|
| *B65B 11/04* | (2006.01) |
| *B25J 15/06* | (2006.01) |
| *B65B 25/14* | (2006.01) |

(52) U.S. Cl.
CPC ......... *B65B 11/045* (2013.01); *B25J 15/0683* (2013.01); *B65B 25/146* (2013.01)

(58) Field of Classification Search
CPC ..... B65B 11/04; B65B 13/181; B65B 25/146; B65B 27/06; B65B 11/045; B25J 9/1682;
(Continued)

(56) References Cited

U.S. PATENT DOCUMENTS

| | | | | |
|---|---|---|---|---|
| 2009/0308267 | A1* | 12/2009 | Song | ....................... B21C 47/24 100/29 |
| 2009/0308268 | A1* | 12/2009 | Song | ....................... B21C 47/28 100/27 |
| 2022/0212893 | A1* | 7/2022 | Steenrod | ............... B65B 25/146 |

FOREIGN PATENT DOCUMENTS

| | | | |
|---|---|---|---|
| KR | 20110137880 A | * | 12/2011 |
| KR | 20110137881 A | * | 12/2011 |

(Continued)

*Primary Examiner* — Chinyere J Rushing-Tucker
(74) *Attorney, Agent, or Firm* — Faegre Drinker Biddle & Reath LLP

(57) ABSTRACT

A system 100 for sheet coil packaging is provided. The system 100 preferably comprises: a sheet coil rotating arrangement 120, arranged to rotate a sheet coil 116 to enable it to be wrapped; first 112 and second 113 industrial robots, having first 108 and second 109 robot arms, arranged to wrap the sheet coil 116 using a wrapping tool 110, using sequences of the first robot arm 108 inserting the wrapping tool 110 into a central hole 118 of the sheet coil 116 and handing over the wrapping tool 110 to the second robot arm 109, and the second robot arm 109 transporting the wrapping tool 110 along the outside of the sheet coil 116 and handing it back to the first robot arm 108, as the sheet coil 116 is rotated by the sheet coil rotating arrangement 120; and two outer edge protection mounting devices 210, 220, arranged at opposite ends of the sheet coil 116 to feed out edge protection material 250 along an outer edge of the sheet coil 116 as the sheet coil 116 is rotated by the sheet coil rotating arrangement 120. The first 112 and second 113 industrial robots are preferably arranged to wrap the sheet coil 116 in synchronization with the feeding out of the edge protection material 250, thereby fixing the edge protection material 250 to the outer edges of the sheet coil 116 by the wrapping as the sheet coil 116 is rotated by the sheet coil rotating arrangement 120.

22 Claims, 7 Drawing Sheets

(58) Field of Classification Search
CPC ............... B25J 15/0683; B25J 15/0616; B25J 15/0052; B25J 9/1669; B25J 9/0084; G05B 2219/45053
USPC .......................................................... 53/399
See application file for complete search history.

(56) References Cited

FOREIGN PATENT DOCUMENTS

| | | | |
|---|---|---|---|
| KR | 20190047964 A | * | 5/2019 |
| WO | WO-2020/193868 A1 | | 10/2020 |
| WO | WO-2021/219861 A2 | | 11/2021 |

* cited by examiner

SYSTEM AND METHOD FOR SHEET COIL PACKAGING

CROSS-REFERENCE TO RELATED APPLICATIONS

This application claims benefit of Swedish Application No. 2250032-6, filed Jan. 17, 2022, which contents are incorporated herein in their entirety by reference.

TECHNICAL FIELD

The present disclosure relates generally to systems and methods for sheet coil packaging.

BACKGROUND

Coils of sheet metal need to be properly wrapped in order to protect the sheet metal during transport and storage. WO 2021/219861 describes sheet coil wrapping using two robot arms and a wrapping tool. During a wrapping sequence, the first robot arm inserts the wrapping tool into the central hole of the sheet coil and hands it over to the second robot arm, which transports the wrapping tool along the outside of the sheet coil and hands it back to the first robot arm.

Especially the edges of the sheet metal coils need to be properly protected, so that the sheet metal will not be damaged along the edges. WO 2020/193868 describes a method for sheet coil packaging, where inner edge protection is used to protect the inner edge of the sheet coil.

Problems with the Prior Art

Since the sheet metal may be damaged along both the inner edges and the outer edges of the sheet coil, it would be advantageous to arrange also outer edge protection during the sheet coil wrapping process.

There is thus a need for improved systems and methods for sheet coil packaging.

SUMMARY

The present disclosure relates to a system for sheet coil packaging. The system preferably comprises: a sheet coil rotating arrangement, arranged to rotate a sheet coil to enable it to be wrapped; first and second industrial robots, having first and second robot arms, arranged to wrap the sheet coil using a wrapping tool, using sequences of the first robot arm inserting the wrapping tool into a central hole of the sheet coil and handing over the wrapping tool to the second robot arm, and the second robot arm transporting the wrapping tool along the outside of the sheet coil and handing it back to the first robot arm, as the sheet coil is rotated by the sheet coil rotating arrangement; and two outer edge protection mounting devices, arranged at opposite ends of the sheet coil to feed out edge protection material along an outer edge or rim of the sheet coil as the sheet coil is rotated by the sheet coil rotating arrangement. The first and second industrial robots are preferably arranged to wrap the sheet coil in synchronization with the feeding out of the edge protection material, thereby fixing the edge protection material to the outer edges of the sheet coil by the wrapping as the sheet coil is rotated by the sheet coil rotating arrangement.

The present disclosure further relates to a method for sheet coil packaging. The method preferably comprises: rotating a sheet coil using a sheet coil rotating arrangement, to enable the sheet coil to be wrapped; wrapping the sheet coil using first and second industrial robots, having first and second robot arms, and a wrapping tool using sequences of the first robot arm inserting the wrapping tool into a central hole of the sheet coil and handing over the wrapping tool to the second robot arm, and the second robot arm transporting the wrapping tool along the outside of the sheet coil and handing it back to the first robot arm, as the sheet coil is rotated by the sheet coil rotating arrangement; and feeding out edge protection material along the outer edge or rim of the sheet coil as the sheet coil is rotated, by using the two outer edge protection mounting devices arranged at opposite ends of the sheet coil. The wrapping of the sheet coil by the first and second industrial robots preferably takes place in synchronization with the feeding out of the edge protection material, thereby fixing the edge protection material to the outer edges of the sheet coil by the wrapping as the sheet coil is rotated by the sheet coil rotating arrangement.

This enables the application of outer edge protection during a sheet coil wrapping process using two robot arms and a wrapping tool, so that the edge protection material becomes fixed to the sheet coil by the wrapping as the sheet coil is rotated by the sheet coil rotating arrangement.

In embodiments, the system further comprises an inner edge protection mounting tool, arranged to be moved by the first and second industrial robots for arranging edge protection material on the inner edges of the sheet coil, around the central hole, before the wrapping of the sheet coil. This enables the application of also inner edge protection during a sheet coil wrapping process using two robot arms and a wrapping tool, so that the edge protection material becomes fixed to the sheet coil by the wrapping.

In embodiments, the inner edge protection mounting tool comprises an edge protection material collecting arrangement, arranged to create a ring of edge protection material to be arranged on an inner edge of the sheet coil. This is convenient way of creating a ring of edge protection material to be arranged on an inner edge of the sheet coil.

In embodiments, the edge protection material collecting arrangement is arranged to collect the edge protection material directly from one of the two outer edge protection mounting devices. There is then no need for separate storage of edge protection material, and the edge protection material can be cut into the desired length by the outer edge protection mounting device.

In embodiments, the edge protection material collecting arrangement comprises means for keeping the edge protection material attached to the inner edge protection mounting tool until the edge protection material is positioned in the central hole, around an inner edge of the sheet coil.

In embodiments, the edge protection material collecting arrangement comprises means for pushing out the ring of edge protection material towards the inner edge of the sheet coil. However, the ring of edge protection material may also expand of its own motion once it has been released from the means for keeping the edge protection material attached to the inner edge protection mounting tool.

In embodiments, the edge protection material collecting arrangement comprises at least three suction cups.

In embodiments, at least some of the suction cups are arranged to be pushed out from the edge protection material collecting arrangement in order to push out the ring of edge protection material towards the inner edge of the sheet coil.

In embodiments, the system further comprises a further sheet coil rotating arrangement and two further outer edge protection mounting devices, in order to enable the robot arms to wrap sheet coils in two different positions. This enables a more efficient system, where the same two industrial robots may wrap sheet coils on sheet coil stations on either side of the industrial robots.

In embodiments, the sheet coil is a sheet metal coil.

In embodiments, the edge protection material comprises plastic and/or cardboard.

The present disclosure also relates to a system for sheet coil packaging. The system preferably comprises: an inner edge protection mounting tool, comprising an edge protection material collecting arrangement, arranged to create a ring of edge protection material and arranging it on an inner edge of a sheet coil, around a central hole of the sheet coil, before the wrapping of the sheet coil; a sheet coil rotating arrangement, arranged to rotate the sheet coil to enable it to be wrapped; and two outer edge protection mounting devices, arranged at opposite ends of the sheet coil to feed out edge protection material along an outer edge of the sheet coil as the sheet coil is rotated by the sheet coil rotating arrangement during wrapping of the sheet coil. The edge protection material collecting arrangement is preferably arranged to collect the edge protection material directly from one of the two outer edge protection mounting devices.

The present disclosure further relates to a method for sheet coil packaging. The method preferably comprises: creating a ring of edge protection material to be arranged on an inner edge of a sheet coil, using an edge protection material collecting arrangement comprised in an inner edge protection mounting tool, by collecting the edge protection material directly from one of two outer edge protection mounting devices arranged at opposite ends of the sheet coil; arranging the ring of edge protection material on the inner edges of a sheet coil, around a central hole of the sheet coil, using the inner edge protection mounting tool, before wrapping of the sheet coil; and feeding out edge protection material along an outer edge of the sheet coil as the sheet coil is rotated by a sheet coil rotating arrangement during wrapping of the sheet coil, using the two outer edge protection mounting devices.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

The present disclosure relates to systems and methods for sheet coil packaging. Embodiments of the disclosed solution are presented in more detail in connection with the figures.

Figure 1:
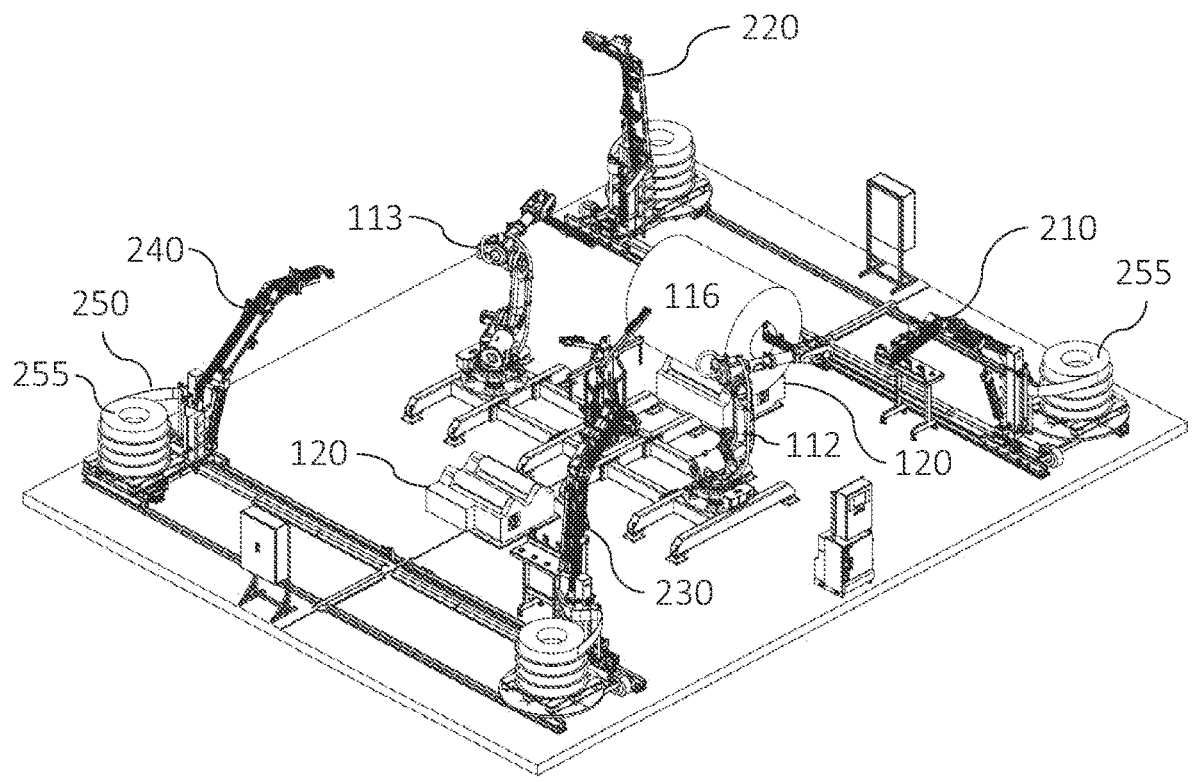
FIG. 1 shows a system for sheet coil packaging, in accordance with one or more embodiments described herein.

FIG. 1 shows a system 100 for sheet coil packaging. The system 100 illustrated in FIG. 1 comprises a sheet coil wrapping arrangement comprising two industrial robots 112, 113 and two pairs of outer edge protection mounting devices 210, 220; 230, 240, each pair arranged together with a sheet coil rotating arrangement 120 arranged to rotate a sheet coil 116 to enable it to be wrapped. The sheet coil wrapping arrangement is arranged to wrap a sheet coil 116 as the sheet coil 116 is rotated by the sheet coil rotating arrangement 120. In the system 100 illustrated in FIG. 1, the same two industrial robots 112, 113 may thus wrap sheet coils 116 on sheet coil stations on either side of the industrial robots 112, 113 in synchronization with the feeding out of edge protection material 250 from the currently active pair of outer edge protection mounting devices 210, 220, so that the edge protection material 250 becomes fixed to the sheet coil 116 by the wrapping as the sheet coil 116 is rotated by the sheet coil rotating arrangement 120. However, the system 100 may comprise only one sheet coil station, and thus only one pair of outer edge protection mounting devices 210, 220 and one sheet coil rotating arrangement 120.

Figure 2:
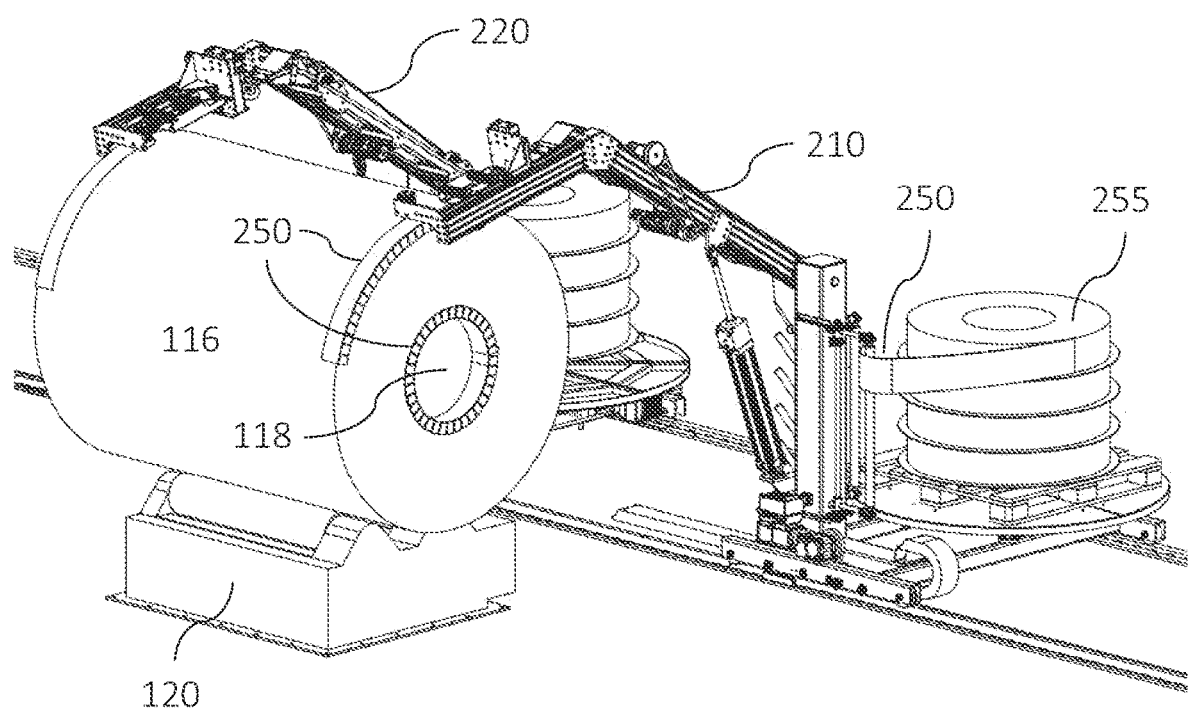
FIG. 2 shows a pair of outer edge protection mounting devices in a system for sheet coil packaging, in accordance with one or more embodiments described herein.

FIG. 2 shows a pair of outer edge protection mounting devices 210, 220 in a system 100 for sheet coil packaging. The two outer edge protection mounting devices 210, 220 are arranged at opposite ends of a sheet coil 116 to feed out edge protection material 250 along the outer edges of the sheet coil 116 as the sheet coil 116 is rotated by the sheet coil rotating arrangement 120. The edge protection material 250 is preferably arranged in an edge protection material coil 255 that may e.g. be mounted on a rotating table, which may be driven by a motor. The edge protection material coils 255 can thereby be made quite large, which means that many sheet coils 116 can be wrapped before an edge protection material coil 255 needs to be replaced.

The edge protection material 250 is preferably folded before it is fed out of the outer edge protection mounting device 210, 220. The edge protection material 250 is preferably stored unfolded, wrapped on an edge protection material coil 255, but as it is folded in the outer edge protection mounting device 210, 220, it becomes more rigid. The edge protection material 250 preferably comprises plastic and/or cardboard, and it may have evenly spaced slits such that a series of tongues are formed when it is folded, as shown in FIG. 2.

The outer edge protection mounting devices 210, 220 are preferably moved down towards the outer edges of the sheet coil 116 to apply the folded edge protection material 250 along the outer edges of the sheet coil 116 as the sheet coil 116 is rotated by the sheet coil rotating arrangement 120. The sheet coil 116 is preferably wrapped, as explained below in connection with FIG. 3, as the sheet coil 116 is rotated and the folded edge protection material 250 is fed out.

If also inner edge protection around the central hole 118 of the sheet coil 116 is used, this is preferably applied before the outer edge protection, as illustrated in FIG. 2. The application of inner edge protection is explained below, in connection with FIGS. 6a-d.

Figure 3:
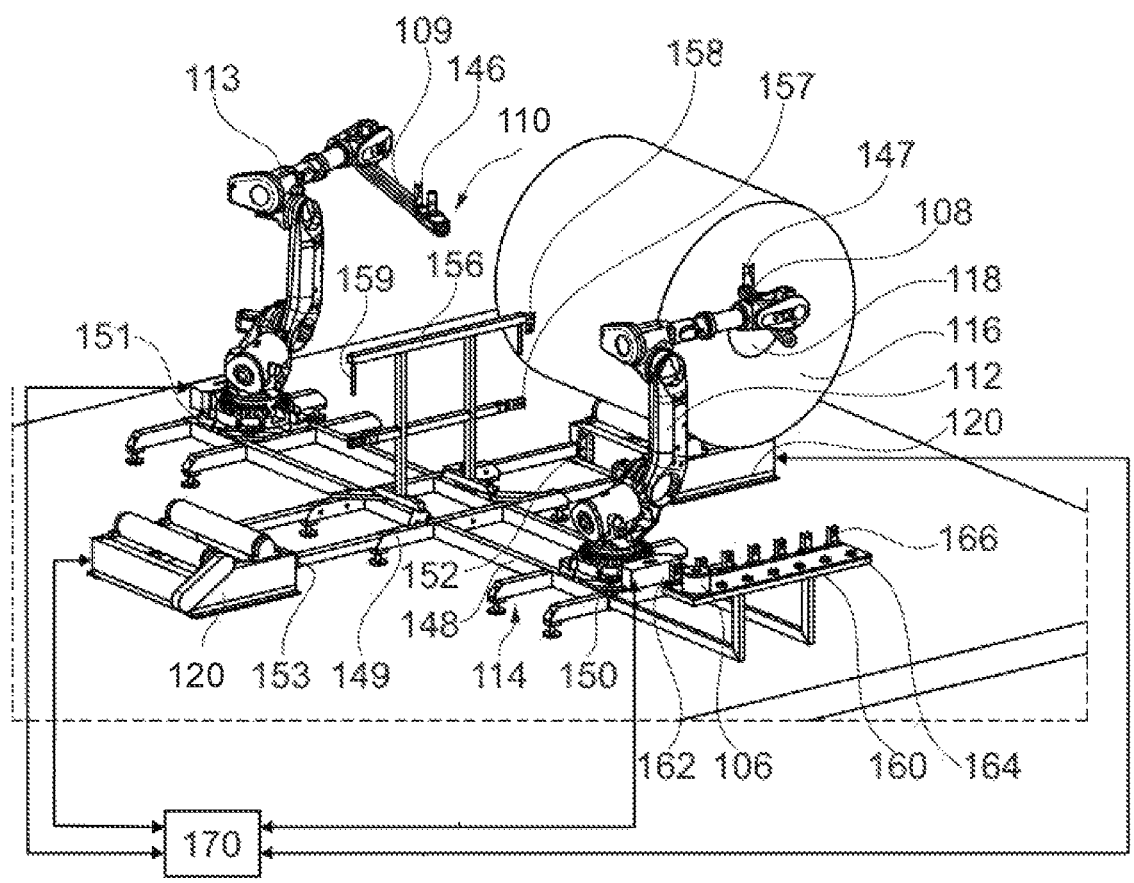
FIG. 3 shows a sheet coil wrapping arrangement comprising two industrial robots in a system for sheet coil packaging, in accordance with one or more embodiments described herein.

FIG. 3 shows a sheet coil wrapping arrangement comprising two industrial robots 112, 113 in a system 100 for sheet coil packaging. Each of the industrial robots 112, 113 has a robot arm 108, 109 arranged to wrap the sheet coil 116 using a wrapping tool 110. The first robot arm 108 inserts the wrapping tool 110 into a central hole 118 of the sheet coil 116 and hands over the wrapping tool 110 to the second robot arm 109. The second robot arm 109 then transports the wrapping tool 110 along the outside of the sheet coil 116 and hands it back to the first robot arm 108. This sequence then continues as the sheet coil 116 is rotated by the sheet coil rotating arrangement 120, as described in WO 2021/219861. In the system 100, the two industrial robots 112, 113 are however arranged to wrap the sheet coil 116 in synchronization with the feeding out of edge protection material 250, so that the edge protection material 250 becomes fixed to the sheet coil 116 by the wrapping as the sheet coil 116 is rotated by the sheet coil rotating arrangement 120. There is preferably an integrated cutting arrangement in each outer edge protection mounting device 210, 220, 230, 240, so that the edge protection material 250 can be cut to the desired length before the wrapping is finished. The length is preferably calculated based on the determined diameter of the central hole 118 in the sheet coil 116.

As shown in FIG. 3, the robot arms 108, 109 may each comprise a wrapping material clamp 146, 147 configured to hold a strip of wrapping material, preferably mounted close to the distal end of the robot arm 108, 109. When a sheet coil 116 has been fully wrapped, a strip of the wrapping material may be clamped in the clamping station 156 and the strip cut. For the purpose of cutting the wrapping material, a strip of the wrapping material may be turned around a shaft 159 at the clamping station 156, in order to keep track of where the wrapping material is in the robot space, and thereafter the strip may be cut. Before cutting the strip of wrapping material, the strip may also be held by the clamp 146, 147 of one of the robot arms 108, 109, so that the remaining wrapping material on a roll 106 on the wrapping tool 110 is ready for a new wrapping procedure. A loose-end strip of the wrapping material turned around the coil may e.g. be arranged to tack to the wrapping by self-adhesive properties. The wrapping material may e.g. be stretch film in a plastic material.

After the wrapping operation in the wrapping station, a crane or similar may be used to lift out the wrapped sheet coil to an after-processing station, where supplementing packing operations may be carried out manually or semi-automatically.

The system 100 may comprise a robot jig 114 having a first 148 and possibly a second 149 intersecting leg. The first leg 148 of the robot jig 114 is configured with first 150 and a second 151 robot base mounts placed apart on said first leg 148. The second leg 149 of the robot jig 114 may be configured with a first coil roller abutment 152 placed at an end of the second leg 149. The sheet coil rotating arrangement 120 may e.g. be positioned in relation to the robot jig 114 with the aid of positioning beams with abutment, so that the sheet coil rotating arrangement 120 will not be in physical or mechanical contact with the robot jig 114 during operation, in order to avoid dynamical forces being conveyed to the robot jig 114.

In embodiments configured with two sheet coil stations, as shown in FIG. 1, the robot jig 114 may comprise two sheet coil rotating arrangements 120, and thus a second coil roller abutment 153 placed at the other end of the second leg 149.

The robot jig 114 shown in FIG. 3 is thus configured with two robot base mounts 150, 151 placed apart on a first leg of the cross geometry, as well as a first and a second coil roller abutment 152, 153 placed apart on a second leg of the cross geometry. First 112 and second 113 industrial robots are mounted on the respective robot base mounts 150, 151. First and second sheet coil rotating arrangements 120 are placed in the respective coil roller abutments 152, 153. Such sheet coil rotating arrangements 120 are per se known and typically comprise a cradle of two rollers that are actuatable to give a sheet coil 116 placed in the cradle a rotating movement.

In the embodiment shown in FIG. 3, the robot jig 114 is configured with a general cross geometry of substantially perpendicular legs with one or more bars, i.e. the bars making up the legs and thus the one or more bars intersecting at substantially right angles. Other intersecting angles may be configured with adapted configurations of the robots, their range and their movements. In the embodiment shown in FIG. 3, each leg comprises two parallel bars. Other embodiments include only a first leg, as described above.

Sheet coils 116 appear in different sizes. A large coil may have a length of 2300 mm, normal sizes are in the range of 1200 to 1500 mm length and down to a minimum that may be 800 mm length. The central hole 118 often has an inner diameter of 508 or 610 mm, and there are diameters as small as 420 mm. The outer diameter of a coil may vary from for example 1 to 2.5 meters.

The system 100 may further comprise a wrapping material clamping station 156 placed within reach of at least one robot arm 108, 109, for example placed substantially midway between the industrial robots 112, 113. The wrapping material clamping station 156 may be provided with one or more wrapping material clamps 157, 158 configured to hold a strip of wrapping material. The wrapping material clamping station 156 may e.g. be placed substantially at the intersection of the first and second legs 148, 149 of the robot jig 114, for example substantially midway between the robot base mounts 150, 151. The wrapping material clamping station 156 may be provided with one or more wrapping material clamps 157, 158 configured to hold a strip of wrapping material.

The system 100 may further comprise a roll magazine 160 for storing a plurality of rolls 106 of wrapping material available to one or more of the industrial robots 112, 113. The roll magazine 160 may e.g. be configured with one or more roll places 164, and an associated wrapping material clamp 162, 166 for each roll of wrapping material. The wrapping material clamps 162, 166 may each be configured to hold a strip of wrapping material. The roll magazine 160 may in use be positioned and placed within reach of at least one of the robots, for example at the side of the robot setup or in front of one of the robots e.g. at the side of the coil roller.

The system 100 may further comprise a measuring arrangement configured to measure the position and dimensions of a sheet coil 116 positioned on a sheet coil rotating arrangement 120 for being packaged with wrapping material. In embodiments, the measuring system comprises one or more laser measuring tools, for example mounted on one of or both robot arms 108, 109. With such a laser measuring tool mounted on the robot arm, it is preferable that it is positioned such that is has an optical line that is unobstructed by a roll of wrapping material attached to the wrapping tool 110. When measuring the position and dimensions, the system 100 is configured to find the center of the coil, follow the contours and calculate the position and the dimensions.

The system 100 may further comprise a robot control system 170 configured to control the movement of the industrial robots 112, 113 in relation to a sheet coil 116 positioned on a sheet coil rotating arrangement 120 in the system 100. The robot control system 170 may comprise input/output interfaces configured to be communicably couplable to the industrial robots 112, 113, to one or more sheet coil rotating arrangements 120, and/or to a human/machine interface (not shown) for example in the form of a GUI generating a dashboard. The robot control system 170 may be used for determining the dimensions of a sheet coil 116 before applying edge protection.

Figure 4:
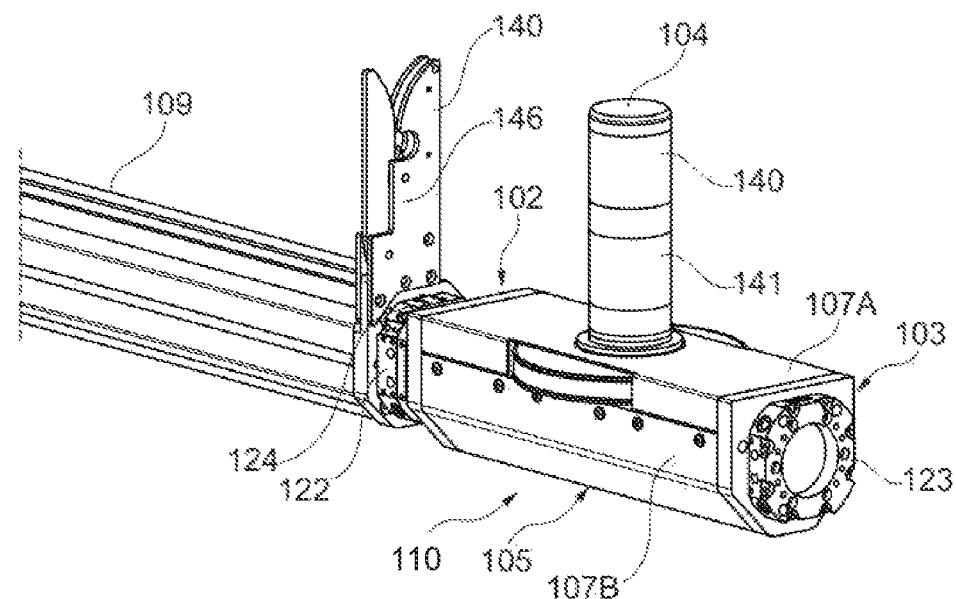
FIG. 4 shows a wrapping tool provided with a roll holder shaft for holding a roll of wrapping material and being configured for handover between robot arms, in accordance with one or more embodiments described herein.
Figure 5:
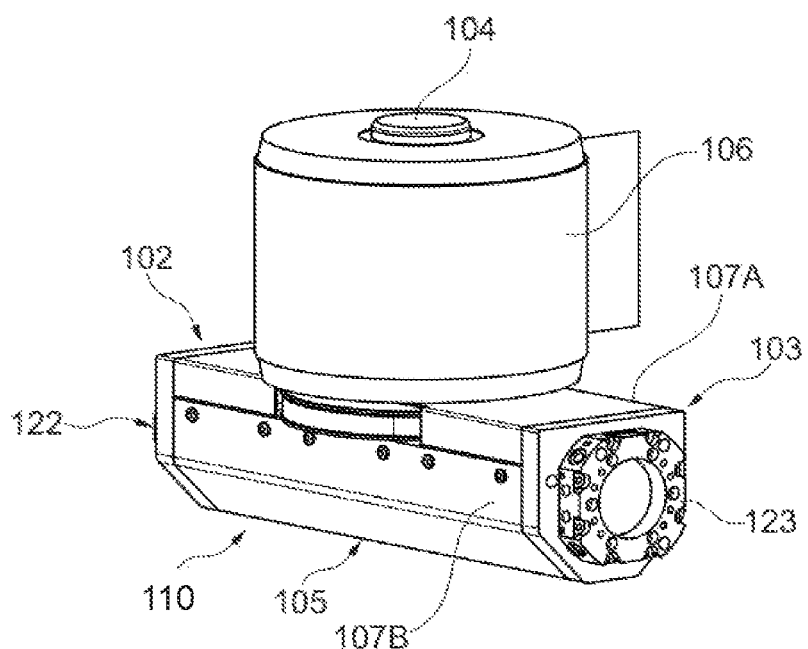
FIG. 5 shows the wrapping tool of FIG. 4 with a roll of wrapping material placed on the roll holder shaft, in accordance with one or more embodiments described herein.

FIG. 4 shows a wrapping tool 110 provided with a roll holder shaft 104 for holding a roll 106 of wrapping material and being configured for handover between robot arms 108, 109, and FIG. 5 shows the wrapping tool 110 of FIG. 4 with a roll 106 of wrapping material placed on the roll holder shaft 104.

The wrapping tool 110 preferably comprises two opposing ends 102, 103, each end being provided with a coupling tool piece 122, 123 configured to interface with a robot arm 108, 109. The wrapping tool 110 preferably further comprises a roll holder shaft 104 configured to hold a roll 106 of packaging material, the holder shaft 104 at one end being rotatably mounted substantially midway between said, preferably opposing, ends 102, 103 and projecting substantially perpendicular to an axis extending between said, preferably opposing, ends 102, 103. The wrapping tool 110 may be provided with a housing 105 comprising one or more cover plates 107A, 107B.

In embodiments, the robot arms 108, 109 are each provided with a coupling robot piece 124, 125, for example a gripper or a master piece of a tool changer, configured to be able to grip or mate with a respective coupling tool piece 122, 123 of the wrapping tool 110. As shown in FIG. 4, a robot arm 109 may be coupled to the wrapping tool 110 via a coupling robot piece 124 that is mated with the robot tool piece 122 to the left in FIG. 4 at one end 102. At the other end 103 of the wrapping tool 110, to the right in FIG. 4, a second coupling tool piece 123 is available for coupling to another robot arm 108 not shown in FIG. 4.

The coupling tool pieces 122, 123 of the wrapping tool 110 are configured to be able to convey actuating power from a power supply line of a robot, such as an industrial robot. The actuating power may in different embodiments for example be in the form of pneumatic power, hydraulic power or electric power. The coupling may typically be configured to be couplable by a bayonet coupling and/or locked in position by means of actuation power controlled by the respective robots.

The coupling configured for interfacing between the industrial robots and the wrapping tool 110 may be configured in the form of a robot tool changer, with the coupling tool piece 122, 123 configured to be able to mate with a coupling master piece 124, 125 of said tool changer mounted on a respective robot arm 108, 109. Such couplings may be configured with a presence sensor adapted to detect or indicate that the wrapping tool 110 is attached to the robot arm 108, 109. The presence sensor may e.g. be integrated in the tool changer functionality of the coupling and be based on pneumatic or electric signals that are readable by the robot control system, or arranged at the side of the coupling, for example in the form of an electric presence detector coupled to the robot control system.

The roll holder shaft 104 may comprise a roll fixture 140, 141 configured to releasably fix a roll of wrapping material to the roll holder shaft 104. For example, a portion 140, 141 of the roll holder shaft 104 may be configured to be radially expandable to enable a roll fixture to releasably fix a roll of wrapping material to the roll holder shaft 104. This may e.g. be implemented as one or more inflatable bladders 140, 141 that are controllably inflatable by means of pneumatic power, i.e. pressurized air, conveyed from the respective robots via the coupling interfaces. Alternatively, the roll fixture 140, 141 may be actuatable for example by electric or hydraulic power. An embodiment comprises first and a second radially expandable portions 140, 141 in the form of inflatable bladders on the shaft 104, such that the first expandable portion is configured to fix a roll of wrapping material having a first lesser wideness, and such that the combined first and second expandable portions are configured to fix a roll of wrapping material having a larger wideness.

The wrapping tool 110 may further comprise at least one motor configured to be able to drive, prevent and/or brake rotation of the roll holder shaft 104. This may enable driving of the roll holder shaft 104 in first rotational direction, e.g. forwards, for example to roll out wrapping material from the roll in synchronization with the movement of the robots, or in a second rotational direction, e.g. backwards, for example to roll up or in wrapping material onto the roll in order gather superfluous wrapping material or increase the tension of the wrapping material. This further enables prevention of rotation of the roll, for example in order to keep a rolled out strip of wrapping material at a certain length or to keep a current tension of the wrapping material. Further, this enables braking of the rotation of the roll, for example in order to obtain, vary or keep a certain tension in the roll.

FIGS. 6a-d show an inner edge protection mounting tool 300, provided with a coupling piece 310 configured to interface with a robot arm 108, 109. The coupling piece 310 is preferably similar to the coupling tool pieces 122, 123 of the wrapping tool 110, since it preferably interfaces with the same robot arms 108, 109. The inner edge protection mounting tool 300 is preferably picked up by a robot arm 108, 109 of an industrial robot 112, 113 before the wrapping process for the sheet coil 116 is started.

The inner edge protection mounting tool 300 comprises an edge protection material collecting arrangement 320, which in the embodiment shown in FIGS. 6a-d comprises two circular mounting plates 321, 322 that are rotatable in relation to the coupling piece 310. This enables the creation of a ring of edge protection material 250 by rotating the edge protection material collecting arrangement 320 when collecting the edge protection material 250. The edge protection material 250 may e.g. be the same edge protection material 250 that is used for protection of the outer edges of the sheet coil 116. The edge protection material collecting arrangement 320 preferably comprises means for keeping the edge protection material 250 attached to the inner edge protection mounting tool 300 until the edge protection material 250 is positioned in the central hole 118, around an inner edge of the sheet coil 116. The edge protection material collecting arrangement 320 may e.g. comprise one or more claws 323, and a number of suction cups 324. In the embodiment shown in FIGS. 6a-d there are two claws 323 and six suction cups 324, but it is possible to use any number of claws 323 and any number of suction cups 324, and e.g. only three suction cups 324 instead of six.

Figure 6A:
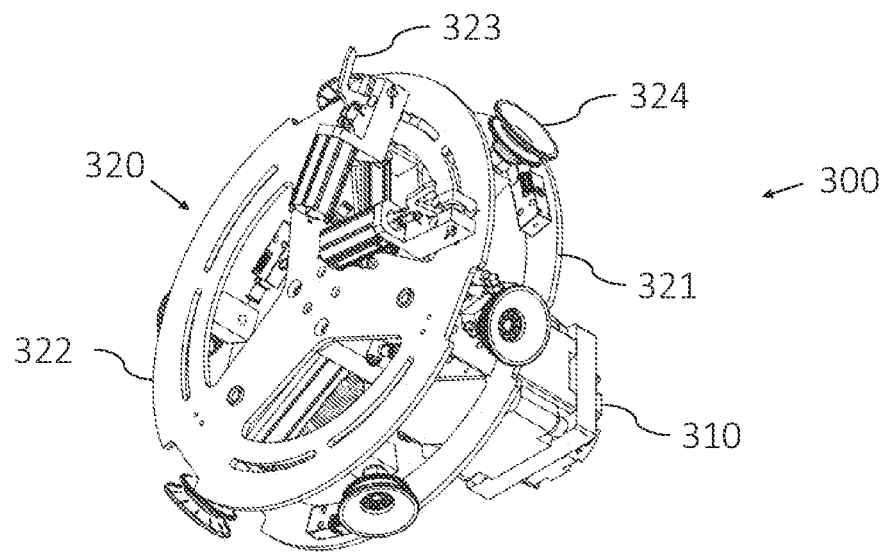
FIGS. 6a-d show an inner edge protection mounting tool, in accordance with one or more embodiments described herein.
Figure 6B:
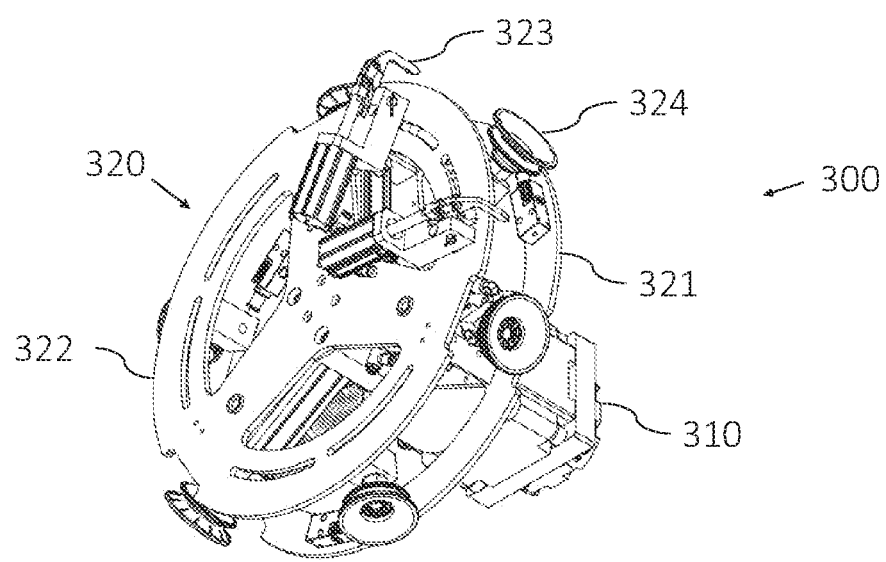
Figure 6C:
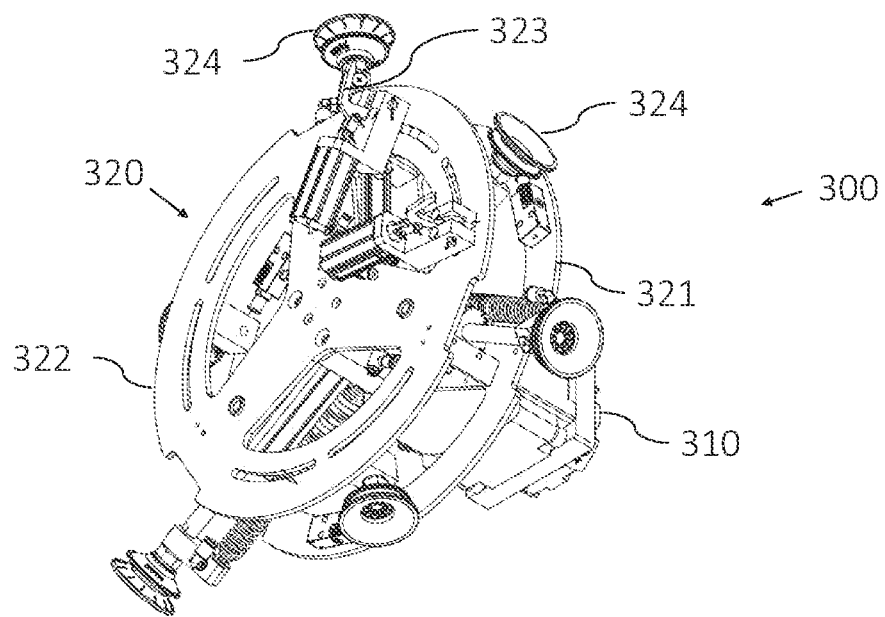
Figure 6D:
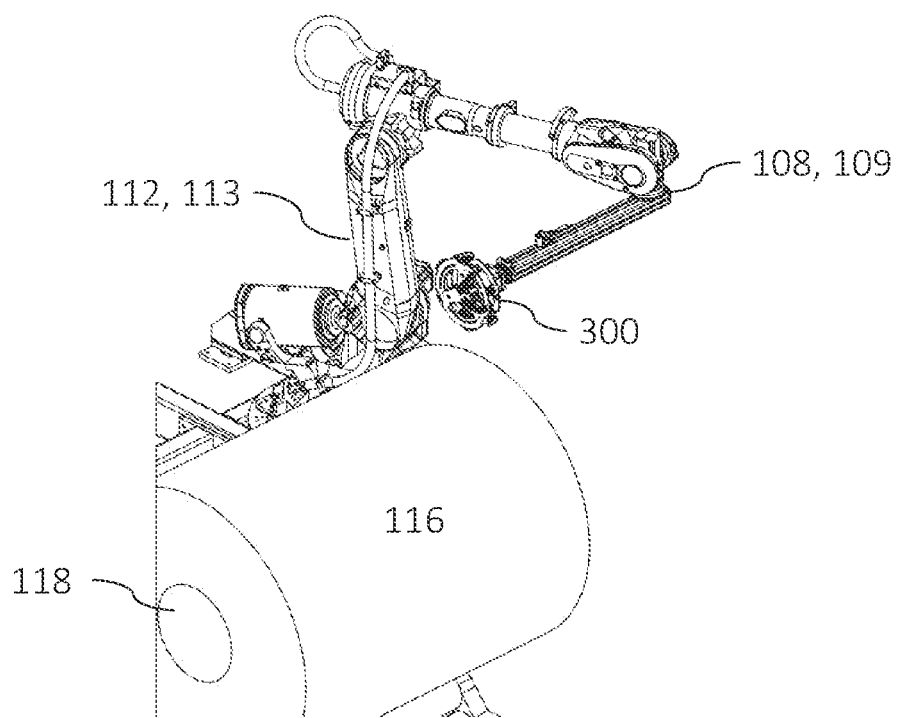

When a new sheet coil 116 arrives at the sheet coil rotating arrangement 120, it is preferred to position edge protection material 250 on both sides of the central hole 118 of the sheet coil 116 before the wrapping process is begun. This is preferably done using the robot arms 108, 109 of the industrial robots 112, 113. Each robot arm 108, 109 picks up the inner edge protection mounting tool 300, interfacing with the coupling piece 310, as shown in FIG. 6d. As explained above, the robot arms 108, 109 may each be provided with a coupling robot piece 124, 125, for example a gripper or a master piece of a tool changer. This coupling robot piece 124, 125 is preferably configured to be able to grip or mate with the coupling piece 310, in the same way as with the coupling tool pieces 122, 123 of the wrapping tool 110.

The coupling piece 310 may be configured to be able to convey actuating power from a power supply line of the industrial robot 112, 113. The actuating power may e.g. be in the form of pneumatic power, hydraulic power or electric power. The coupling may typically be configured to be couplable by a bayonet coupling and/or locked in position by means of actuation power controlled by the respective robots. The coupling configured for interfacing between the industrial robots 112, 113 and the inner edge protection mounting tool 300 may be configured in the form of a tool changer, with the coupling piece 310 configured to be able to mate with a coupling master piece 124, 125 of said tool changer mounted on a respective robot arm 108, 109. Such couplings may be configured with a presence sensor adapted to detect or indicate that the inner edge protection mounting tool 300 is attached to the robot arm 108, 109. The presence sensor may e.g. be integrated in the tool changer functionality of the coupling and be based on pneumatic or electric signals that are readable by the robot control system 170, or arranged at the side of the coupling, for example in the form of an electric presence detector coupled to the robot control system 170.

The robot arm 108, 109 then moves the inner edge protection mounting tool 300 to a position where edge protection material 250 can be collected. If the edge protection material 250 is the same edge protection material 250 that is used for protection of the outer edges of the sheet coil, the edge protection material 250 may be collected directly from one of the edge protection mounting devices 210, 220, 230, 240. In that case, the edge protection mounting device 210, 220, 230, 240 feeds out edge protection material 250 of the desired length, and this is picked up by the edge protection material collecting arrangement 320, e.g. using suction cups 324, during rotation of the edge protection material collecting arrangement 320 so that a ring of edge protection material 250 is created around the edge protection material collecting arrangement 320. The edge protection material 250 may however of course instead be collected from another storage of edge protection material 250. There is preferably a small overlap of edge protection material 250 in the ring, and the edges of the edge protection material 250 may be held in place using the claws 323. FIG. 6a illustrates open claws 323, during collection of edge protection material 250, and FIG. 6b illustrates closed claws 323, when the ring of edge protection material 250 has been created and the inner edge protection mounting tool 300 is moved away from the storage of the edge protection material 250.

The inner edge protection mounting tool 300 is moved, using the industrial robot 112, 113, into the central hole 118 of the sheet coil 116, while the ring of edge protection material 250 is kept attached to the inner edge protection mounting tool 300, e.g. using the claws 323 and the suction cups 324. The ring of edge protection material 250 may then be pushed out from the inner edge protection mounting tool 300, using means for pushing out the ring of edge protection material 250, e.g. at least some of the suction cups 324, as shown in FIG. 6c. However, the ring of edge protection material 250 may also simply be released from the means for keeping the edge protection material attached to the inner edge protection mounting tool 300, and expand of its own motion.

If the edges of the edge protection material 250 have been held in place using claws 323, the claws 323 are preferably opened before the edge protection material 250 is released from the inner edge protection mounting tool 300. When the edge protection material 250 is released, the ring of edge protection material 250 expands slightly, so that it fits the inner edge of the sheet coil, around the central hole 118. The industrial robot 112, 113 then moves the inner edge protection mounting tool 300 out of the central hole 118, and hands it over to the other industrial robot 112, 113, or places it in a storage position.

The ring of edge protection material 250 stays in the central hole 118 due to the material properties of the edge protection material 250—when the edge protection material 250 is folded, it tries to straighten out. This is normally enough to keep the ring of edge protection material 250 in position during the wrapping of the sheet coil 116, so that the ring of edge protection material 250 becomes fixed to the sheet coil 116 by the wrapping as the sheet coil 116 is rotated by the sheet coil rotating arrangement 120. It is preferred not to use any type of adhesives to keep the ring of edge protection material 250 in position.

The system 100 for sheet coil packaging preferably comprises: a sheet coil rotating arrangement 120, arranged to rotate a sheet coil 116 to enable it to be wrapped; first 112 and second 113 industrial robots, having first 108 and second 109 robot arms, arranged to wrap the sheet coil 116 using a wrapping tool 110, using sequences of the first robot arm 108 inserting the wrapping tool 110 into a central hole 118 of the sheet coil 116 and handing over the wrapping tool 110 to the second robot arm 109, and the second robot arm 109 transporting the wrapping tool 110 along the outside of the sheet coil 116 and handing it back to the first robot arm 108, as the sheet coil 116 is rotated by the sheet coil rotating arrangement 120; and two outer edge protection mounting devices 210, 220, arranged at opposite ends of the sheet coil 116 to feed out edge protection material 250 along an outer edge of the sheet coil 116 as the sheet coil 116 is rotated by the sheet coil rotating arrangement 120. The first 112 and second 113 industrial robots are preferably arranged to wrap the sheet coil 116 in synchronization with the feeding out of the edge protection material 250, thereby fixing the edge protection material 250 to the outer edges of the sheet coil 116 by the wrapping as the sheet coil 116 is rotated by the sheet coil rotating arrangement 120.

However, the system 100 works also with other types of arrangements for wrapping the sheet coil 116—it may not be necessary to use industrial robots 112, 113.

The system 100 for sheet coil packaging may therefore alternatively comprise: an inner edge protection mounting tool 300, comprising an edge protection material collecting arrangement 320, arranged to create a ring of edge protection material 250 and arranging it on an inner edge of a sheet coil 116, around a central hole 118 of the sheet coil 116, before the wrapping of the sheet coil 116; a sheet coil rotating arrangement 120, arranged to rotate the sheet coil 116 to enable it to be wrapped; and two outer edge protection mounting devices 210, 220, arranged at opposite ends of the sheet coil 116 to feed out edge protection material 250 along an outer edge of the sheet coil 116 as the sheet coil 116 is rotated by the sheet coil rotating arrangement 120 during wrapping of the sheet coil 116. The edge protection material collecting arrangement 320 is preferably arranged to collect the edge protection material 250 directly from one of the two outer edge protection mounting devices 210, 220.

Method Embodiments

Figure 7:
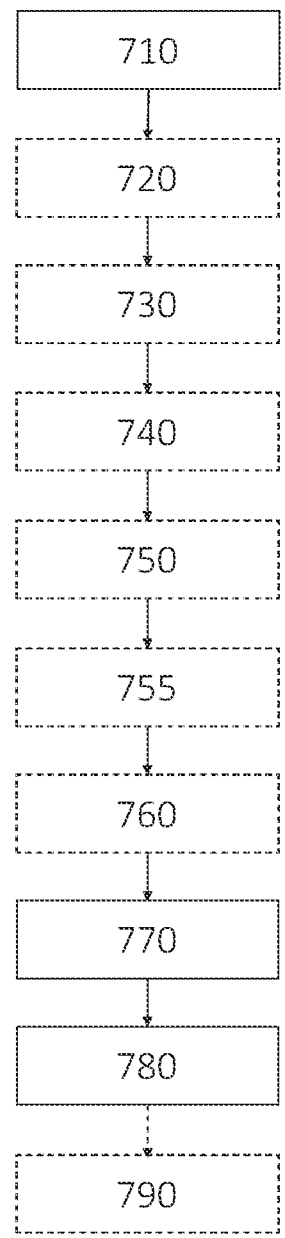
FIG. 7 schematically illustrates a method for sheet coil packaging, in accordance with one or more embodiments described herein.

FIG. 7 schematically illustrates a method 700 for sheet coil packaging. The method 700 may comprise:

Step 710: rotating a sheet coil 116 using a sheet coil rotating arrangement 120, to enable the sheet coil 116 to be wrapped.

Step 770: wrapping the sheet coil using first 112 and second 113 industrial robots, having first 108 and second 109 robot arms, and a wrapping tool 110, using sequences of the first robot arm 108 inserting the wrapping tool into an central hole 118 of the sheet coil 116 and handing over the wrapping tool 110 to the second robot arm 109, and the second robot arm 109 transporting the wrapping tool 110 along the outside of the sheet coil 116 and handing it back to the first robot arm 108, as the sheet coil 116 is rotated by the sheet coil rotating arrangement 120.

Step 780: feeding out edge protection material 250 along an outer edge of the sheet coil 116 as the sheet coil 116 is rotated by the sheet coil rotating arrangement 120, using two outer edge protection mounting devices 210, 220 arranged at opposite ends of the sheet coil 116.

The wrapping 770 of the sheet coil 116 by the first 112 and second 113 industrial robots preferably takes place in synchronization with the feeding out 780 of the edge protection material 250, thereby fixing the edge protection material 250 to the outer edges of the sheet coil 116 by the wrapping as the sheet coil 116 is rotated by the sheet coil rotating arrangement 120.

Such a method enables the application of outer edge protection during a sheet coil wrapping process using two robot arms and a wrapping tool, so that the edge protection material becomes fixed to the sheet coil by the wrapping as the sheet coil is rotated by the sheet coil rotating arrangement.

The method 700 may further comprise one or more of:

Step 720: collecting the edge protection material 250 directly from one of the two outer edge protection mounting devices 210, 220. There is then no need for separate storage of edge protection material 250, and the edge protection material 250 can be cut into the desired length by the outer edge protection mounting device 210, 220.

Step 730: creating a ring of edge protection material 250 to be arranged on an inner edge of the sheet coil 116, using an edge protection material collecting arrangement 320 comprised in the inner edge protection mounting tool 300. This is convenient way of creating a ring of edge protection material 250 to be arranged on an inner edge of the sheet coil 116.

Step 740: using means 323, 324 comprised in the edge protection material collecting arrangement 320 for keeping the edge protection material 250 attached to the inner edge protection mounting tool 300 until the edge protection material 250 is positioned in the central hole 118, around an inner edge of the sheet coil 116.

Step 750: using means comprised in the edge protection material collecting arrangement 320 for pushing out the ring of edge protection material 250 towards the inner edge of the sheet coil 116. However, the ring of edge protection material 250 may also expand of its own motion once it has been released from the means for keeping the edge protection material attached to the inner edge protection mounting tool 300.

Step 755: pushing at least some suction cups 324 comprised in the edge protection material collecting arrangement 320 out from the edge protection material collecting arrangement 320 in order to push out the ring of edge protection material 250 towards the inner edge of the sheet coil 116.

Step 760: arranging edge protection material 250 on the inner edges of the sheet coil 116, around the central hole 118, using an inner edge protection mounting tool 300 that is moved by the first 112 and second 113 industrial robots, before the wrapping of the sheet coil 116. This enables the application of also inner edge protection during a sheet coil wrapping process using two robot arms 112, 113 and a wrapping tool 110, so that the edge protection material 250 becomes fixed to the sheet coil 116 by the wrapping.

Step 790: rotating a further sheet coil 116 using a further sheet coil rotating arrangement 120, and feeding out edge protection material 250 along an outer edge of the further sheet coil 116 as the further sheet coil 116 is rotated by the further sheet coil rotating arrangement 120, using two further outer edge protection mounting devices 230, 240 arranged at opposite ends of the further sheet coil 116. This enables a more efficient system, where the same two industrial robots 112, 113 may wrap sheet coils 116 on sheet coil stations on either side of the industrial robots 112, 113.

In embodiments, the sheet coil 116 is a sheet metal coil.

However, the method 700 works also with other types of arrangements for wrapping the sheet coil 116—it may not be necessary to use industrial robots 112, 113.

The method 700 for sheet coil packaging may therefore alternatively comprise:

Step 730: creating a ring of edge protection material 250 to be arranged on an inner edge of a sheet coil 116, using an edge protection material collecting arrangement 320 comprised in an inner edge protection mounting tool 300, by collecting 720 the edge protection material 250 directly from one of two outer edge protection mounting devices 210, 220 arranged at opposite ends of the sheet coil 116.

Step 760: arranging the ring of edge protection material 250 on the inner edges of a sheet coil 116, around a central hole 118 of the sheet coil 116, using the inner edge protection mounting tool 300, before wrapping of the sheet coil 116.

Step 780: feeding out edge protection material 250 along an outer edge of the sheet coil 116 as the sheet coil 116 is rotated by a sheet coil rotating arrangement 120 during wrapping of the sheet coil 116, using the two outer edge protection mounting devices 210, 220.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. For example, in the above description, the sheet coil wrapping arrangement comprises industrial robots, but many other types of sheet coil wrapping arrangements are known. The claimed invention encompasses also the use of other types of sheet coil wrapping arrangements for wrapping the sheet coil. Further, not all of the steps of the claims have to be carried out in the listed order. All technically meaningful orders of the steps are covered by the claims. Accordingly, the scope of the invention is defined only by the claims.

The invention claimed is:

1. A system for sheet coil packaging, the system comprising:
a sheet coil rotating arrangement, arranged to rotate a sheet coil to enable it to be wrapped;
first and second industrial robots, having first and second robot arms, arranged to wrap the sheet coil using a wrapping tool, using sequences of the first robot arm inserting the wrapping tool into a central hole of the sheet coil and handing over the wrapping tool to the second robot arm, and the second robot arm transporting the wrapping tool along the outside of the sheet coil and handing it back to the first robot arm, as the sheet coil is rotated by the sheet coil rotating arrangement; and
two outer edge protection mounting devices, arranged at opposite ends of the sheet coil to feed out edge protection material along an outer edge of the sheet coil as the sheet coil is rotated by the sheet coil rotating arrangement;
wherein the first and second industrial robots are arranged to wrap the sheet coil in synchronization with the feeding out of the edge protection material, thereby fixing the edge protection material to the outer edges of the sheet coil by the wrapping as the sheet coil is rotated by the sheet coil rotating arrangement.

2. The system according to claim 1, further comprising an inner edge protection mounting tool, arranged to be moved by the first and second industrial robots for arranging edge protection material on the inner edges of the sheet coil, around the central hole, before the wrapping of the sheet coil.

3. The system according to claim 2, wherein the inner edge protection mounting tool comprises an edge protection material collecting arrangement, arranged to create a ring of edge protection material to be arranged on an inner edge of the sheet coil.

4. The system according to claim 3, wherein the edge protection material collecting arrangement is arranged to collect the edge protection material directly from one of the two outer edge protection mounting devices.

5. The system according to claim 3, wherein the edge protection material collecting arrangement comprises means for keeping the edge protection material attached to the inner edge protection mounting tool until the edge protection material is positioned in the central hole, around an inner edge of the sheet coil.

6. The system according to claim 3, wherein the edge protection material collecting arrangement comprises means for pushing out the ring of edge protection material towards the inner edge of the sheet coil.

7. The system according to claim 3, wherein the edge protection material collecting arrangement comprises at least three suction cups.

8. The system according to claim 7, wherein at least some of the suction cups are arranged to be pushed out from the edge protection material collecting arrangement in order to push out the ring of edge protection material towards the inner edge of the sheet coil.

9. The system according to claim 1, further comprising a further sheet coil rotating arrangement and two further outer edge protection mounting devices, in order to enable the robot arms to wrap sheet coils in two different positions.

10. The system according to claim 1, wherein the sheet coil is a sheet metal coil.

11. A method for sheet coil packaging, the method comprising:
rotating a sheet coil using a sheet coil rotating arrangement, to enable the sheet coil to be wrapped;
wrapping the sheet coil using first and second industrial robots, having first and second robot arms, and a wrapping tool, using sequences of the first robot arm inserting the wrapping tool into a central hole of the sheet coil and handing over the wrapping tool to the second robot arm, and the second robot arm transporting the wrapping tool along the outside of the sheet coil and handing it back to the first robot arm, as the sheet coil is rotated by the sheet coil rotating arrangement; and
feeding out edge protection material along an outer edge of the sheet coil as the sheet coil is rotated by the sheet coil rotating arrangement, using two outer edge protection mounting devices arranged at opposite ends of the sheet coil;
wherein the wrapping of the sheet coil by the first and second industrial robots takes place in synchronization with the feeding out of the edge protection material, thereby fixing the edge protection material to the outer edges of the sheet coil by the wrapping as the sheet coil is rotated by the sheet coil rotating arrangement.

12. The method according to claim 11, further comprising arranging edge protection material on the inner edges of the sheet coil, around the central hole, using an inner edge protection mounting tool that is moved by the first and second industrial robots, before the wrapping of the sheet coil.

13. The method according to claim 12, further comprising creating a ring of edge protection material to be arranged on an inner edge of the sheet coil, using an edge protection material collecting arrangement comprised in the inner edge protection mounting tool.

14. The method according to claim 13, further comprising collecting the edge protection material directly from one of the two outer edge protection mounting devices.

15. The method according to claim 13, further comprising using means comprised in the edge protection material collecting arrangement for keeping the edge protection material attached to the inner edge protection mounting tool until the edge protection material is positioned in the central hole, around an inner edge of the sheet coil.

16. The method according to claim 13, further comprising using means comprised in the edge protection material collecting arrangement for pushing out the ring of edge protection material towards the inner edge of the sheet coil.

17. The method according to claim 13, wherein the edge protection material collecting arrangement comprises at least three suction cups.

18. The method according to claim 13, further comprising pushing at least some of the suction cups out from the edge protection material collecting arrangement in order to push out the ring of edge protection material towards the inner edge of the sheet coil.

19. The method according to claim 11, further comprising rotating a further sheet coil using a further sheet coil rotating arrangement, and feeding out edge protection material along an outer edge of the further sheet coil as the further sheet coil is rotated by the further sheet coil rotating arrangement, using two further outer edge protection mounting devices arranged at opposite ends of the further sheet coil.

20. The method according to claim 11, wherein the sheet coil is a sheet metal coil.

21. A system for sheet coil packaging, the system comprising:
- an inner edge protection mounting tool, comprising an edge protection material collecting arrangement, arranged to create a ring of edge protection material and arranging it on an inner edge of a sheet coil, around a central hole of the sheet coil, before the wrapping of the sheet coil;
- a sheet coil rotating arrangement, arranged to rotate the sheet coil to enable it to be wrapped; and
- two outer edge protection mounting devices, arranged at opposite ends of the sheet coil to feed out edge protection material along an outer edge of the sheet coil as the sheet coil is rotated by the sheet coil rotating arrangement during wrapping of the sheet coil;

wherein the edge protection material collecting arrangement is arranged to collect the edge protection material directly from one of the two outer edge protection mounting devices.

22. A method for sheet coil packaging, the method comprising:
- creating a ring of edge protection material to be arranged on an inner edge of a sheet coil, using an edge protection material collecting arrangement comprised in an inner edge protection mounting tool, by collecting the edge protection material directly from one of two outer edge protection mounting devices arranged at opposite ends of the sheet coil;
- arranging the ring of edge protection material on the inner edges of a sheet coil, around a central hole of the sheet coil, using the inner edge protection mounting tool, before wrapping of the sheet coil; and
- feeding out edge protection material along an outer edge of the sheet coil as the sheet coil is rotated by a sheet coil rotating arrangement during wrapping of the sheet coil, using the two outer edge protection mounting devices.

* * * * *